United States Patent Office 2,866,698
Patented Dec. 30, 1958

2,866,698
DIAMOND ABRASIVE ELEMENT
Paul L. Kuzmick, Passaic, N. J.
No Drawing. Application May 13, 1953
Serial No. 354,875
11 Claims. (Cl. 51—308)

The present invention relates to a diamond abrasive element, and in particular to such an element having a novel bonding composition for the diamond particles.

The manufacture of diamond abrasive products, and in particular of diamond abrasive discs and wheels, has presented manifold difficulties particularly insofar as the choice of a suitable bonding material is concerned. Such a bonding material must not only posses sufficient strength so as to constitute a rigid matrix in which the diamond abrasive particles are held, but the material must also be of such a character as to adhere to the small diamond particles in order that those particles will be retained in the wheel for abrasive action until their usefulness is at an end. In addition it is requisite that the bonding material be so constituted that when the diamond particles on the surface of the abrasive article become worn, they will break away from the article, thus exposing new abrasive particles, so that the abrasive article may be used over a long period of time. It follows that the bonding material itself must be of sufficient hardness so that it too will break away from the abrasive element as the element is used in order to expose new abrasive particles at the operative surface thereof. If the bonding material is not sufficiently hard, it would tend to smear over the abrasive surface, covering the abrasive particles and rendering the article useless.

The major factor limiting the type of bonding material useable with diamond abrasive particles is the chemical nature of the diamond particles themselves, which tend to oxidize and lose their abrasive qualities if raised to too high a temperature over any appreciable period of time. Since most suitable bonding materials require a maturing treatment over a long period of time at temperatures such that substantial oxidation will take place, it has been found necessary, when such bonding materials are used, to carry out the cure in an inert or reducing atmosphere in order to minimize oxidation of the diamond particles. Not only does the cure itself materially increase cost of production of the abrasive articles because of its long duration, which necessarily leads to limited quantity production, but the requirement of a non-oxidizing atmosphere makes for great expense in the carrying out of the cure, since relatively complex equipment is required and expensive chemicals are consumed in the process.

In order to eliminate the use of a non-oxidizing atmosphere, various bond compositions have been proposed which mature at temperatures sufficiently low so that oxidation is not excessive when an ordinary atmosphere is employed. Some of these bonding compositions have resulted in commercially acceptable abrasive articles, but they are all characterized by the fact that relatively long maturing periods, on the order of several hours, are required. As has already been stated, this increases the cost of the finished article and reduces productivity. In addition, it has been found that if a diamond abrasive article is maintained at such temperatures for the long period of time necessary for cure of the bond, some oxidation or deterioration does take place, the extent of the deterioration of the abrasive particles depending upon the length of time to which they are subjected to elevated temperatures. Hence, even when bonding materials are employed which mature at relatively low temperatures, on the order of 1800° F., the necessity for using non-oxidizing atmospheres has not in the past been entirely eliminated because of the extended curing times involved.

Attempts have been made, as in Whittaker and Kuzmick Patent 2,555,175 of May 29, 1951, to utilize a bonding material which softens at such a low temperature that no appreciable curing period is required, thus eliminating the necessity for utilizing inert atmospheres in the production of the articles. Satisfactory results have been obtained in accordance with the teachings of that patent. However, a grinding wheel produced according to the present invention approaches more closely to the ultimate in excellence in abrasive elements of this type. The nature of the bond is such that an exceptionally long life is produced together with the attainment of free cutting characteristics comparable to those exhibited by resinoid bonded wheels.

In accordance with the present invention a novel type of bonding material is employed which consists of a vitrified portion and a metal portion present in substantially equal amounts by weight, both portions having approximately the same softening temperature. The metal portion, it is believed, forms a supporting skeleton of appreciable hardness and toughness around which the vitrified portion flows, the latter wetting the abrasive particles and bonding those particles to the metal skeleton, thus producing a very strong composite diamond bearing structure. Each portion may soften at temperatures within the range of 2000° to 2350° F., with a temperature of approximately 2200° F. preferred. When diamond particles are ordinarily subjected to temperatures in this range even for a short period of time, a significant amount of oxidation will occur. However, when the diamond particles are thoroughly mixed with the composite bonding material of the present invention, no appreciable oxidation of the particles occurs, at least during the short period of time that the diamond particles need be retained at such temperatures in the manufacture of the products of the present invention. Consequently, although high forming temperatures are involved, no special atmosphere need be employed.

The metal portion of the bonding material must be sufficiently hard and brittle so that it can wear away with the used-up diamond particles as the wheel, disc or other element abrades. It must also be capable of softening at a sufficiently low temperature so that the element can be formed within the temperature range above specified, thus eliminating the necessity for employing inert or reducing atmospheres. The metal portion therefore preferably consists of a number of constituents each contributing its own characteristics to the mix and combining with the other constitutents to produce a bonding portion having the desired properties.

Tungsten carbide is employed in the metallic portion of the bonding material in substantial proportions, largely because that substance is extremely hard. Metals such as iron, copper, cobalt and nickel are added in order to make the mixture workable and formable at temperatures within the desired range, these substances acting in effect as binders for the tungsten carbide particles. In addition, it has been found desirable to add comparatively small amounts of metallic fluxing materials such as manganese and graphite in order to control and modify the softening temperature of the metallic composition and certain specific physical properties thereof.

One specific mixture which has given excellent results is as follows:

| | Carats |
|---|---|
| Tungsten carbide (—230 mesh) | 650 |
| Carbonyl E iron | 280 |
| Copper (200 mesh) | 68 |
| Manganese | 1.4 |
| Graphite | 1.4 |
| Total | 1000.8 |

The proportion of tungsten carbide by weight in the metal composition itself may vary between 40 and 80%. The iron may be varied between 16 and 40%. Copper may be varied between 0 and 20%. Cobalt or nickel may be substituted in part for either the iron or the copper. The manganese may be varied between 0 and 8%. The graphite may be varied between 0 and 4%. By decreasing the amount of iron, the softening temperature of the metal composition is raised. By reducing the amount of graphite present, the softening temperature is increased. By decreasing the amount of manganese, a lower impact strength is imparted to the finished product, while by increasing the amount of manganese an increase in ductility and impact strength is produced.

The vitrified portion of the bond may in general be any vitrified composition capable of wetting the diamond particles and having a softening temperature within the range of 2000° to 2350° F. which, when cooled, results in a hard product. Many such vitrified compositions are known, and some of them have even been employed with diamond abrasive particles in the past, although they generally required the use of long curing times and inert atmospheres. It may broadly be stated that any hard glass softening within the above mentioned temperature range may be used as the vitrified part of the bonding material of the present invention. Borosilicate glass is particularly suitable. One specific mix which has been employed with excellent results is as follows:

| | Carats |
|---|---|
| Feldspar | 240.0 |
| Kaolin | 240.0 |
| Borax glass | 32.5 |
| Boric acid (anhydrous) | 32.5 |
| Silica | 65.0 |
| Silicon carbide (120 mesh) | 390.0 |
| Total | 1000.0 |

The various components of this composition and their functions are well known to those versed in the art. As indicative only of the numerous possible variations the kaolin may be varied between 0 and 30% of the total weight of the vitrified portion, the feldspar may be varied between 10 and 40% of the total weight, with the total kaolin and feldspar content not exceeding 50%.

Another glass which can be used in the bond of the present invention is one having substantially the following composition and maturing at approximately 1800° F.:

| | Percent |
|---|---|
| $SiO_2$ | 74.16 |
| $B_2O_3$ | 11.02 |
| $Na_2O$ | 12.03 |
| $K_2O$ | .09 |
| $CaO$ | .27 |
| $Al_2O_3$ | 2.02 |
| $As_2O_5$ | .36 |

In using a glass of this type the $SiO_2$ may be varied in amounts between about 70 and 80%, the $B_2O_3$ may be varied between about 11–20%, the $Na_2O$ may be varied between about 3 and 13% and the $Al_2O_3$ may be varied between about 2–10%. A glass having a somewhat higher softening temperature, but which may nevertheless be used in the present invention, is one having the approximate composition by weight of $SiO_2$ 70%, $B_2O_3$ 20% and $Na_2O$ 10%.

As indicated above, appreciable latitude in the precise composition of the metal portion and particularly of the vitrified portion of the bonding material of the present invention is permitted. However, the compositions of the two portions must be such that the softening temperature of each portion is substantially the same as that of the other portion in conjunction with which it is employed. If the metal composition is such as to have a softening temperature of 2000° F. while the vitrified composition has the softening temperature of 2350° F., optimum results will not be obtained. The metal composition would in such a case tend to separate from the vitrified composition, running to the bottom of the mold. If the situation were reversed, if the softening temperature of the vitrified composition were appreciably below the softening temperature of the metal composition, the vitrified composition would tend to carbonize and hence would lose its strength.

While it is not necessary that the softening temperatures of the two parts of the bond material be exactly the same, they should be as close as possible to one another, preferably not more than on the order of 100° F. from one another. Correspondingly, it has been found that the amounts by weight of the metal parts and the vitrified part should be substantially equal. The proportion of each by weight should not vary more than 10% either way from the optimum weight which is equal to the weight of the other part. In other words, each of the parts must be present in proportions between 40 and 60% of their combined weights.

In making a diamond wheel according to the present invention the constituents of the metal and vitrified portions of the bonding material are mixed together, ball-milled for a period of eight hours and then screened. If desired, the glass forming ingredients may be fritted if desired before they are mixed with the metal constituents, but this is not at all essential, and in some instances superior results have been obtained when both compositions are made in a single batch. In the single batch operation care must be taken that the proportions of the constituents of the two portions are so related that the portions are present in substantially equal amounts, as mentioned above. When the metal and vitrified portions are separately prepared, the weight of material required for a particular sized wheel is determined, divided by two, and equal portions of the metal and vitrified compositions are weighed out, mixed, and again ball-milled for eight hours.

The thus prepared bonding material is then mixed with the desired proportions of diamond abrasive particles and placed in a mold. One effective proportion of diamond particles to bonding material has been found to be 13 carats of No. 100 mesh diamond particles to 84 carats of bonding material. This proportion may, of course, be varied in accordance with economic considerations, the desired use to which the product is to be put, and the other factors well known to those skilled in the art.

Of course, the diamond wheel may be formed in two sections, only the outer section of which contains diamond particles, as is conventional. For example, in making a 4″ wheel with a ⅛″ deep diamond portion, 553 carats of bonding material alone is employed for the core support section while 84 carats of bonding material and 13 carats of diamond abrasive particles are employed in the outer diamond portion.

When a two section wheel is to be produced, the core supporting material is first placed carefully in the appropriate part of the mold and subjected to approximately 2500 lbs. per sq. in. cold pressure. The pressure is released, the core supporting material retaining its proper shape and form, and the mixture of bonding material and diamond particles is then spread carefully around the preformed central section.

The mold and its contents are then heated to a temperature corresponding to the softening temperature of the vitrified and metal portions employed, and at the same time an initial pressure of approximately 150 lbs. per sq. in. is applied to the mold contents. The heat may be applied in any appropriate manner, as by use of an induction coil. With the specific formulations for metal and vitrified compositions previously set forth, a softening temperature of approximately 2200° F. is indicated. When the mold contents have reached the desired temperature, the pressure is raised to approximately 1000 lbs. per sq. in., and the pressure and temperature are continued for a period of approximately five minutes. Thereafter the heating is discontinued but the pressure remains applied until the temperature has dropped to approximately 1800° F., at which time the pressure is released. The temperature is permitted to drop until the mold is no longer red, and the wheel is then stripped from the mold readily for final sizing.

It will be noted that the diamond particles are subjected to a temperature of 2200° F. for a period of approximately five minutes. In the past this temperature and period of time has been thought to be inadmissible when fine diamond particles were involved unless an inert or reducing atmosphere was employed. However, in the instant invention, the metal part of the bonding material, in addition to providing a hard and strong skeletal structure for the diamond element, also apparently inhibits oxidation of the diamond particles sufficiently to permit the use of the fairly high temperatures here involved without harmful effects.

In addition, a diamond wheel is produced which has operating characteristics of an exceptionally high calibre. For example, a 4" diameter grinding wheel ⅛" wide and using diamond particles having a 100 grit particle size and made according to the present invention was rotated at 3450 R. P. M. and caused to continuously grind a high grade tungsten carbide test block having a hardness of 92 on the Rockwell "A" scale for a period of six hours. In that time it removed 135 grams of the tungsten carbide, while losing only .0015" in its diameter.

By using a metal composition in conjunction with and in substantially the same amounts as the vitrified composition, a diamond abrasive element such as a wheel or disk may be produced in a simple manner, in a short period of time, and without having to employ special equipment or atmospheres. At the same time bonding materials, both metal and vitrified, may be employed which have sufficient hardness so as not to interfere with the most efficient utilization of the diamond particles when the article is used.

I claim:

1. A diamond abrasive element comprising diamond particles and a bond therefor comprising a first portion consisting essentially of a glass capable of wetting diamond particles having a softening temperature between 2000° and 2350° F. and forming a hard glass when cooled, and a second portion consisting essentially of a mixture of metallic substances having a softening temperature in the same range and becoming hard and brittle when cooled, each of said portions being present in proportions between 40 and 60% of their combined weights, said second portion comprising tungsten carbide particles and a binder therefor comprising a member of the group consisting of iron, copper, cobalt, nickel and mixtures thereof.

2. A diamond abrasive element comprising diamond particles and a bond therefor comprising a metal portion and a vitrified portion, each portion being present in proportions between 40 and 60% of their combined weights, said metal portion comprising, in proportions by weight, tungsten carbide 40–80%, a member of the group consisting of iron, copper, cobalt, nickel and mixtures thereof 20–60%, and a metallic fluxing agent 0–8%, said vitrified portion comprising a hard glass capable of wetting diamond particles, having a softening temperature between 2000° and 2350° F., and forming a hard product when cooled, said metal portion having substantially the same softening temperature as said vitrified portion.

3. The diamond abrasive element of claim 2, in which said metal portion comprises, in proportions by weight, tungsten carbide 40–80%, iron 16–40%, copper 0–20%, manganese 0–4% and graphite 0–2%.

4. The diamond abrasive element of claim 2, in which said metal portion comprises, in approximate proportions by weight, tungsten carbide 64.8%, iron 28%, copper 6.8%, manganese .2% and graphite .2%.

5. The diamond abrasive element of claim 4, in which said metal and vitrified portions are present in substantially equal quantities.

6. The diamond abrasive element of claim 11, in which said vitrified portion comprises, in proportions by weight, feldspar 10–40%, kaolin 0–30%, borax glass approximately 3%, boric acid approximately 3%, silica approximately 6.5%, and silicon carbide approximately 39%.

7. The diamond abrasive element of claim 6, in which said metal and said vitrified portions are present in substantially equal quantities.

8. The diamond abrasive element of claim 11, in which said vitrified portion comprises in proportions by weight, $SiO_2$ 70–80%, $B_2O_3$ 11–20%, $Na_2O$ 3–13% and $Al_2O_3$ 0–10%.

9. The diamond abrasive element of claim 8, in which said metal and vitrified portions are present in substantially equal quantities.

10. A diamond abrasive element comprising diamond particles and a bond therefor comprising a borosilicate glass having a softening temperature between 2000° and 2350° F. and forming hard glass when cooled, and a second portion containing tungsten carbide particles and a binder therefor comprising a member of the group consisting of iron, copper, cobalt, nickel and mixtures thereof, each of said portions being present in proportions between 40 and 60% of their combined weights.

11. A diamond abrasive element comprising diamond particles and a bond therefor comprising a metal portion and a vitrified portion, each portion being present in proportions between 40 and 60% of their combined weights, said metal portion comprising, in proportions by weight, tungsten carbide 40–80%, a member of the group consisting of iron, copper, cobalt, nickel and mixtures thereof 20–60%, and a metallic fluxing agent 0–8%, said vitrified portion comprising a borosilicate glass having a softening temperature between 2000° and 2350° F., said metal portion having substantially the same softening temperature as said vitrified portion.

References Cited in the file of this patent

UNITED STATES PATENTS

| | | |
|---|---|---|
| 2,476,699 | Cline | July 19, 1949 |
| 2,495,257 | Hunter et al. | Jan. 24, 1950 |
| 2,555,174 | Whittaker et al. | May 29, 1951 |
| 2,609,285 | Thomas | Sept. 2, 1952 |